United States Patent
Han et al.

(10) Patent No.: US 11,955,672 B2
(45) Date of Patent: Apr. 9, 2024

(54) FUEL CELL HYDROGEN MODULE

(71) Applicant: Woodward, Inc., Fort Collins, CO (US)

(72) Inventors: Yi Han, Fort Collins, CO (US); Nolan Polley, Fort Collins, CO (US); Domenico Chiera, Fort Collins, CO (US); Gregory James Hampson, Boulder, CO (US)

(73) Assignee: Woodward, Inc., Fort Collins, CO (US)

( * ) Notice: Subject to any disclaimer, the term of this patent is extended or adjusted under 35 U.S.C. 154(b) by 0 days.

(21) Appl. No.: 18/047,976

(22) Filed: Oct. 19, 2022

(65) Prior Publication Data

US 2023/0118048 A1 Apr. 20, 2023

Related U.S. Application Data

(60) Provisional application No. 63/262,798, filed on Oct. 20, 2021.

(51) Int. Cl.
*H01M 8/0438* (2016.01)
*H01M 8/04089* (2016.01)
(Continued)

(52) U.S. Cl.
CPC ... *H01M 8/04432* (2013.01); *H01M 8/04097* (2013.01); *H01M 8/04104* (2013.01);
(Continued)

(58) Field of Classification Search
CPC ......... H01M 8/04432; H01M 8/04097; H01M 8/04104; H01M 8/04582; H01M 8/04597;
(Continued)

(56) References Cited

U.S. PATENT DOCUMENTS 5,059,494 A 10/1991 Vartanian et al.
10,316,803 B2 6/2019 Hampson et al.
(Continued)

FOREIGN PATENT DOCUMENTS

EP 3432399 1/2019
JP 2010251096 11/2010

OTHER PUBLICATIONS

International Search Report and Written Opinion in International Application No. PCT/US2022/078437, dated Mar. 13, 2023, 14 pages.

*Primary Examiner* — Christian Roldan
(74) *Attorney, Agent, or Firm* — Fish & Richardson P.C.

(57) ABSTRACT

The subject matter of this specification can be embodied in, among other things, a hydrogen fuel cell anode control system including a hydrogen inlet configured to receive pressurized hydrogen, a hydrogen outlet configured to be fluidically coupled to an anode manifold of a hydrogen fuel cell, a recirculation inlet configured to receive overflow hydrogen from the anode manifold, a hydrogen pressure regulator configured to receive pressurized hydrogen from the hydrogen inlet, a hydrogen recirculation module configured to mix hydrogen received from the hydrogen pressure regulator and the recirculation inlet, and provide a hydrogen mixture to the hydrogen outlet, a differential pressure measurement module configured to measure a differential pressure between the anode manifold and a cathode manifold of the hydrogen fuel cell, and a controller configured to control at least one of the hydrogen pressure regulator or the hydrogen recirculation module based on the measured differential pressure.

10 Claims, 7 Drawing Sheets

(51) Int. Cl.
  *H01M 8/04537* (2016.01)
  *H01M 8/04746* (2016.01)
  *H01M 8/04828* (2016.01)
  *H01M 8/0662* (2016.01)

(52) U.S. Cl.
  CPC ... *H01M 8/04582* (2013.01); *H01M 8/04597* (2013.01); *H01M 8/04753* (2013.01); *H01M 8/04783* (2013.01); *H01M 8/04835* (2013.01); *H01M 8/0662* (2013.01)

(58) Field of Classification Search
  CPC ......... H01M 8/04753; H01M 8/04783; H01M 8/04835; H01M 8/0662; H01M 8/04119; H01M 8/04589; H01M 8/04798; Y02E 60/50
  USPC ........................................................ 429/410
  See application file for complete search history.

(56) References Cited

U.S. PATENT DOCUMENTS

| | | | |
|---|---|---|---|
| 10,995,705 B2 | 5/2021 | Mastbergen et al. | |
| 11,092,091 B2 | 8/2021 | Farrow et al. | |
| 2005/0238935 A1* | 10/2005 | Ueda | H01M 8/04104 429/513 |
| 2006/0115696 A1* | 6/2006 | Kanai | H01M 8/04835 429/513 |
| 2015/0372329 A1* | 12/2015 | Jomori | H01M 8/043 429/432 |
| 2020/0161682 A1* | 5/2020 | Park | H01M 8/04783 |

\* cited by examiner

FUEL CELL HYDROGEN MODULE

CROSS-REFERENCE TO RELATED PATENT APPLICATIONS

This application claims the benefit of priority to U.S. Provisional Application No. 63/262,798, filed Oct. 20, 2021, the contents of which are incorporated by reference herein.

TECHNICAL FIELD

This instant specification relates to hydrogen fuel cells.

BACKGROUND

Hydrogen fuel cells are devices that are configured to consume hydrogen and oxygen in a catalyzed electrochemical process that produces electricity as its main product, and produces water and heat as an exhaust. The appeal of such devices is apparent, but their implementation has been slowed because the construction of such devices remains highly customized and application-specific, the volume manufacturing base has not been developed so that their costs are high, the fuel infrastructure is as yet not established, and they lack robustness and durability, which is also a result of conventional controls. Improving controls can improve efficiency, power output, as well as, robustness and durability, thus increasing the value proposition for fuel cell systems

SUMMARY

In general, this document describes systems and techniques for controlling hydrogen delivery in hydrogen fuel cells.

In an example embodiment, a hydrogen fuel cell anode control system includes a hydrogen inlet configured to receive pressurized hydrogen, a hydrogen outlet configured to be fluidically coupled to an anode manifold of a hydrogen fuel cell, a recirculation inlet configured to receive overflow hydrogen from the anode manifold, a hydrogen pressure regulator configured to receive pressurized hydrogen from the hydrogen inlet, a hydrogen recirculation module configured to mix hydrogen received from the hydrogen pressure regulator and the recirculation inlet, and provide a hydrogen mixture to the hydrogen outlet, a differential pressure measurement module configured to measure a differential pressure between the anode manifold and a cathode manifold of the hydrogen fuel cell, and a controller configured to control at least one of the hydrogen pressure regulator or the hydrogen recirculation module based on the measured differential pressure.

Various embodiments can include some, all, or none of the following features. The controller can be configured to control hydrogen pressure such that the differential pressure is about zero. The hydrogen pressure regulator can be a controllable gas pressure regulator system. The hydrogen recirculation module can include a gas recirculation pump. The hydrogen recirculation module can include a jet pump. The system can include a current feedback input port configured to receive an electrical current measurement based on a power output of the fuel cell, wherein the controller is further configured to control at least one of the hydrogen pressure regulator or the hydrogen recirculation module based on the electrical current measurement. The system can include a current feedback input port configured to receive an electrical current measurement based on a power input of a compressor configured to provide oxygen to the cathode manifold, wherein the controller is further configured to control at least one of the hydrogen pressure regulator or the hydrogen recirculation module based on the electrical current measurement. The controller can be configured to control hydrogen pressure based on a predetermined control model. The system can include a humidity controller configured to control a humidity level of the hydrogen mixture. The system can include a nitrogen separator configured to reduce a nitrogen level in at least one of the overflow hydrogen or the hydrogen mixture. The controller can be further configured to control a variable pressure control valve configured to control a pressure of the overflow hydrogen.

In an example implementation, a method of controlling anode manifold pressure of a hydrogen fuel cell, the method including measuring an anode manifold pressure, measuring a cathode manifold pressure, determining a differential pressure value based on the measured anode manifold pressure and the measured cathode manifold pressure, controlling at least one of a hydrogen pressure regulator or a hydrogen recirculation module or an anode exit valve based on the determined differential pressure.

Various implementations can include some, all, or none of the following features. The method can include receiving pressurized hydrogen, regulating, by the hydrogen pressure regulator, the received pressurized hydrogen to a regulated pressure, receiving overflow hydrogen from an anode manifold, mixing, by a hydrogen recirculation module, received pressurized hydrogen received from the hydrogen pressure regulator with the received overflow hydrogen, and provide a hydrogen mixture to a hydrogen outlet. Controlling at least one of the hydrogen pressure regulator or the hydrogen recirculation module based on the determined differential pressure can include controlling the anode manifold pressure such that the differential pressure is about zero. The method can include receiving a current measurement based on a power output of the hydrogen fuel cell, and controlling at least one of the hydrogen pressure regulator or the hydrogen recirculation module based on the received current measurement. The method can include receiving a current measurement based on a power consumption of a compressor configured to provide oxygen to a cathode manifold, and controlling at least one of the hydrogen pressure regulator or the hydrogen recirculation module based on the received current measurement. The method can include controlling, by the controller, a humidity control module to controllably add or remove humidity from the hydrogen mixture based on a predetermined humidity level. The method can include a nitrogen separator module configured to reduce a nitrogen level in at least one of the overflow hydrogen or the hydrogen mixture. The method can include controlling, by a variable pressure control valve, a pressure of the overflow hydrogen.

In another example embodiments, a hydrogen fuel cell assembly includes a hydrogen fuel cell comprising an anode manifold, a stack, and a cathode manifold, and a hydrogen fuel cell anode control system having a hydrogen inlet configured to receive pressurized hydrogen, a hydrogen outlet configured to be fluidically coupled to an anode manifold of a hydrogen fuel cell, a recirculation inlet configured to receive overflow hydrogen from the anode manifold, a hydrogen pressure regulator configured to receive pressurized hydrogen from the hydrogen inlet, a hydrogen recirculation module configured to mix hydrogen received from the hydrogen pressure regulator and the recirculation inlet, and provide a hydrogen mixture to the hydrogen outlet, a differential pressure measurement module configured to measure a differential pressure between the anode manifold and a cathode manifold of the hydrogen fuel cell, and a controller configured to control at least one of the hydrogen pressure regulator or the hydrogen recirculation module based on the measured differential pressure.

The systems and techniques described here may provide one or more of the following advantages. First, a hydrogen sub-system can provide rapid implementation of fuel cell assemblies. Second, the system can improve fuel cell efficiency. Third, the system can improve fuel cell longevity. Fourth, the system can provide a modular solution to fuel cell assemblies that improves maintainability of the fuel cell system.

The details of one or more implementations are set forth in the accompanying drawings and the description below. Other features and advantages will be apparent from the description and drawings, and from the claims.

DETAILED DESCRIPTION

This document describes systems and techniques for controlling hydrogen delivery in hydrogen fuel cells. In general, an anode fuel module is configured with the fluid flow conduits, control loop electronics, controllable valves, and related components as an integrated module that can be used in conjunction with a hydrogen fuel cell stack to quickly implement a useful hydrogen fuel cell application. In general, the anode fuel module is configured to control the flow of hydrogen to a fuel cell anode based on electrical demand, control the amount of oxygen (e.g., air) at the fuel cell cathode, control the amount of nitrogen and water at the fuel cell anode, monitor and control differential pressure across the fuel cell membrane, and provide efficient recirculation of hydrogen at the anode.

Figure 1:
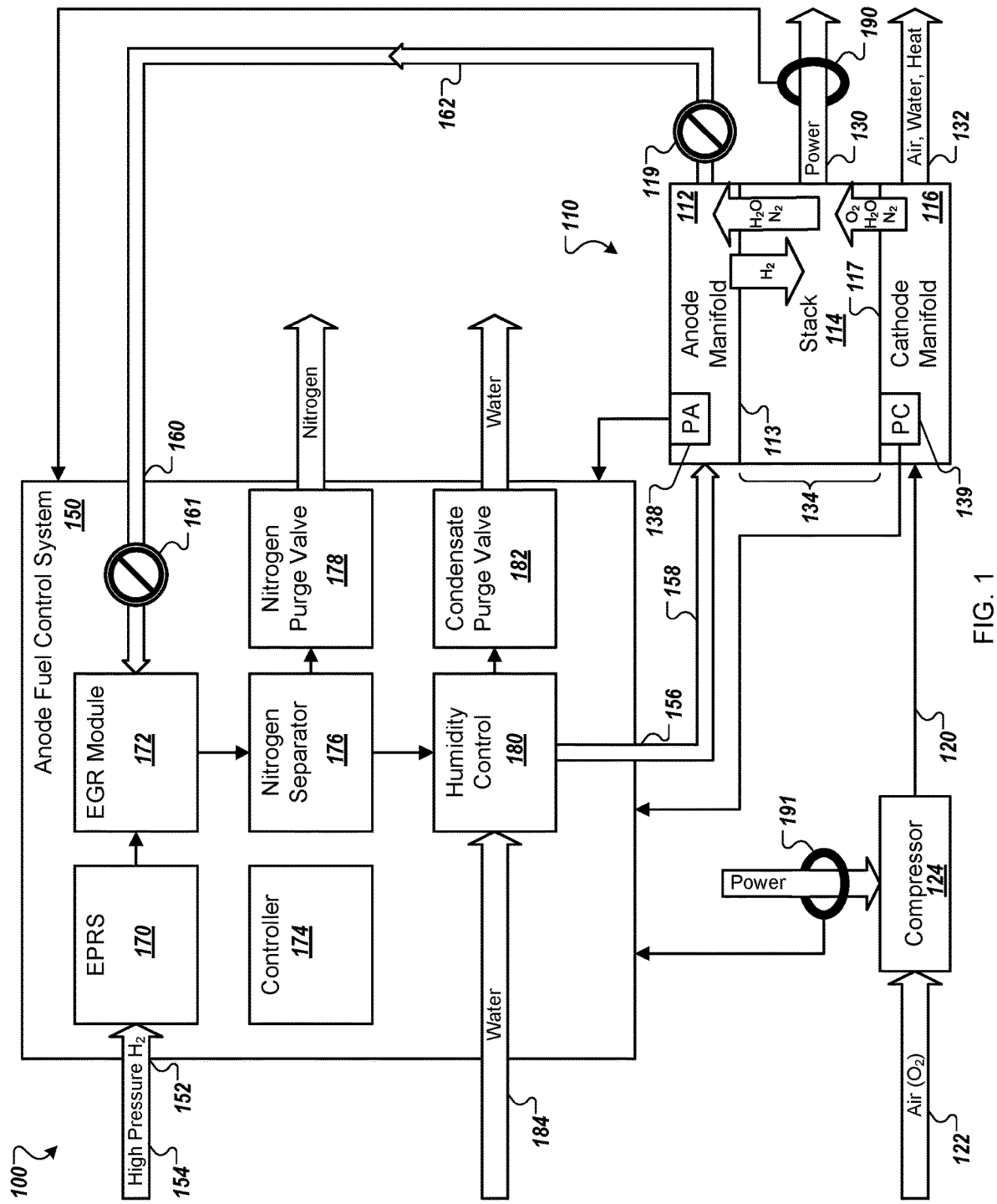
FIG. 1 is a schematic diagram that shows an example hydrogen fuel cell system.

FIG. 1 is a schematic diagram that shows an example hydrogen fuel cell system 100. The system 100 includes a hydrogen fuel cell 110 comprising an anode manifold 112 at a negative anode membrane 113, a stack 114, and a cathode manifold 116 at a positive cathode membrane 117. The anode manifold 112 is configured to receive hydrogen fuel, and the cathode manifold is configured to receive oxygen 120, generally from atmospheric air 122, compressed or otherwise provided by a compressor 124. In the hydrogen fuel cell, a catalyst in the anode manifold separates hydrogen molecules into protons and electrons that take different paths to the cathode. The electrons go through a power outlet 120 to an external circuit, creating a flow of electricity. The protons pass through the stack 114 to the cathode, where the protons unite with oxygen and the electrons to produce water and heat at an exhaust 132.

The stack 114 generates electricity in the form of direct current (DC) power from electrochemical reactions that take place in the hydrogen fuel cell 110. In the illustrated example, a single hydrogen fuel cell is shown, but in some embodiments multiple (e.g., tens or hundreds) of fuel cells can be combined. For example, a single fuel cell can typically produce about 1V, so in some embodiments, multiple individual fuel cells can be combined in series into a fuel cell stack. For example, some fuel cell stacks may include hundreds of fuel cells. In some embodiments, the amount of power produced by a fuel cell can depend upon various factors, such as fuel cell type, cell size, operational temperature, and the pressure of the gases supplied to the cell.

The anode manifold 112 includes a collection of catalyst layers. In some embodiments, the catalyst layers can include nanometer-sized particles of platinum dispersed on a carbon support having a large surface area. This platinum particulate catalyst can be mixed with an ion-conducting polymer (e.g., ionomer) and arranged between the membrane and gas diffusion layers (GDLs). At the anode manifold 112, the platinum catalyst enables hydrogen molecules to be split into protons and electrons. At the cathode manifold 116, the platinum catalyst enables oxygen reduction by reacting with the protons generated by the anode manifold 112, producing water. The ionomer mixed into the catalyst layers allows the protons to travel through these layers, while non-conducting, forcing the produced electrons to travel through an electrical circuit—producing electrical power.

GDLs (not shown) are arranged outside the catalyst layers and are configured to transport reactants gasses into the catalyst layers, as well as to remove water produced by the reaction. In some embodiments, the GDLs can be made of sheets of carbon paper in which the carbon fibers are partially coated with polytetrafluoroethylene (PTFE). Gases can diffuse rapidly through the pores in the GDLs, and the pores can be kept open by the PTFE, which is hydrophobic, and prevents excessive water buildup. In some embodiments, the inner surface of the GDL can be coated with a thin layer of high-surface-area carbon mixed with PTFE (e.g., a microporous layer). The microporous layer can help adjust the balance between water retention (e.g., which can aid in the maintenance of membrane conductivity) and water release (e.g., done to keep the pores open so hydrogen and oxygen can diffuse into the anode manifold 112 and the cathode manifold 116).

The compressor 124 is configured to compress atmospheric air received at an intake and provide it at an outlet that is fluidically connected by a fluid conduit to an inlet of the cathode manifold 116 at a specified pressure. In general, fuel cell performance improves as the pressure of the reactant gases increases. Pressure within the anode manifold 112 is created by a supply of pressurized hydrogen flowing into the anode manifold, and an outflow through a flow controller 119 (e.g., a fix or variable orifice). Pressure within the cathode manifold 116 is based on the pressure supplied from the compressor 124.

In some embodiments, the compressor 124 can be configured to raise the pressure of the inlet air 122 to about two to four times the ambient atmospheric pressure. However, if the pressures of the reactant gasses in the anode manifold 112 and the cathode manifold 116 are unbalanced, a pressure differential 134 can form across the membranes 113, 116 and the stack 114. Excessive pressure differentials (e.g., differentials that exceed a predetermined tolerance band around zero) can damage the membranes 113, 116, so the pressures of the reactant gasses must be kept relatively equal in order to prevent, eliminate, or otherwise reduce the pressure differential 134.

To control the flow of hydrogen to the fuel cell 110 and to control the differential pressure 134, a hydrogen fuel cell anode control system 150 is provided. In general, the system 150 is configured as a modular system that can be quickly connected to the fuel cell 110 by a hydrogen fluid circuit to allow for rapid deployment and configuration of hydrogen fuel cell solutions, and can control differential pressures across the fuel cell membrane by actively controlling hydrogen flows based on a closed feedback loop.

The system 150 includes a hydrogen inlet port 152 configured to coupled to, and receive pressurized hydrogen 154 at a predetermined pressure from a pressurized hydrogen supply, and a hydrogen outlet port 156 configured to couple to a fluid conduit configured to provide pressurized hydrogen 158 to the anode manifold 122. The system 150 also includes a recirculation inlet port 160 coupled to a fluid conduit that is also coupled to an outlet of the anode manifold 122. The recirculation inlet port 160 is configured to receive recirculation (e.g., overflow hydrogen) gasses 162 from the anode manifold 122. Since the recirculation gasses 162 can be rich with unconsumed hydrogen, the system 150 is configured to maintain hydrogen efficiency by recirculating unused hydrogen through the system 100 and using the pressurized hydrogen 158 to replenish the hydrogen that is consumed by the fuel cell 110.

Replenishment of consumed hydrogen is provided by an electronically controlled pressure regulator system (EPRS) 170 and a jet pump 172. The EPRS 170 is configured to receive the pressurized hydrogen 158 and controllably reduce the pressure to a usable level. Examples of the EPRS 170 are discussed in more detail in U.S. Pat. No. 11,092,091, filed Mar. 19, 2018, the contents of which are incorporated by reference herein. The EPRS 170 is configured to be controlled by a controller 174 to control the replenishment of hydrogen consumed by the fuel cell 110 and to control the overall pressure of the hydrogen supply to the fuel cell 100.

The jet pump 172 is configured to recirculate hydrogen that has not been consumed (due to an operating surplus) from the stack 113 and return it back to the hydrogen infeed. Operation of the jet pump 172 is controlled by a controller 174. Examples of the jet pump 172 are discussed in more detail in U.S. Pat. No. 10,316,803, filed Sep. 25, 2017, and in U.S. Pat. No. 10,995,705, filed Feb. 7, 2019, the contents of which are incorporated by reference herein. In the '803 patent, the jet pump is used in the context of exhaust gas recirculation (EGR), but in the example of jet pump 172 it is used to recirculate overflow hydrogen. As will be described in more detail below, the jet pump 172 has two inlets and one outlet; one inlet (e.g., configured to receive the secondary fluid) is configured to fluidically coupled to the anode manifold 112 to receive recirculated hydrogen, and the other inlet (e.g., configured to receive the primary, pressurized fluid) is coupled to the EPRS 170 to receive fresh hydrogen. The jet pump is configured with a converging/diverging flow path configured such that the fresh flow can create a venturi effect that draws, sucks, pumps, or otherwise promotes the flow of recirculation gasses into the flow of fresh hydrogen. The fresh and recirculated hydrogen mix within the jet pump 172 and exit the outlet, and via properly designed area expansion, recover pressure by converting velocity to pressure. In some implementations, the venturi effect of the jet pump 172 can allow the jet pump 172 to urge flow of the recirculated gasses without the use of impellers or other moving parts. In some configurations, the jet pump 172 can be used with a powered impeller to reduce the total externally supplied pumping power (which represents a parasitic power consumption, thus reducing the electrical efficiency of the overall system). As will be described in more detail below, the controller 174 is configured to control operation of the EPRS 170 and the jet pump 172 and when needed the anode exit orifice to control pressure within the anode manifold 112.

The system 150 also includes a nitrogen separator 176 and a nitrogen purge valve 178. The nitrogen separator is fluidically coupled to the outlet of the jet pump 172. During operation of the fuel cell 110, nitrogen from the air in the cathode manifold 116 migrates across the stack to the anode manifold 112 (e.g., nitrogen crossover). However, nitrogen will accumulate over time and its presence in the flow to the anode manifold 112 takes up volume that could be occupied by hydrogen and blocks pores in the membrane, restricting hydrogen access to the GDL, reducing the amount of hydrogen present at a selected pressure and reducing the efficiency of the system 100. The nitrogen separator 176 is configured to remove nitrogen from the flow (e.g., reducing nitrogen content to about 5% or less), and purge the nitrogen from the system 100 through the purge valve 178. However, removal of nitrogen frees up molecular volume within the anode flow, which in turn causes the anode pressure to drop. The nitrogen separator 176 and the nitrogen purge valve 178 are controlled by the controller 174. In some implementations, the controller 174 can control the nitrogen separator 176 in part based on a gas pressure in the anode manifold 112. In some embodiments, the nitrogen separator may be omitted, so that the hydrogen in the recirculation loop with the nitrogen is also purged, which represents a loss of otherwise consumable hydrogen. This could be a loss on the order of 5-7% of hydrogen consumption rate, representing a very significant overall efficiency loss.

The system 150 also includes a humidity controller 180 and a condensate purge valve 182. The humidity controller 180 is fluidically coupled to an outlet of the nitrogen separator 176. During operation of the fuel cell 110, water is formed as the hydrogen gas at the anode manifold 112 combines with oxygen from the air provided at the cathode manifold 116, and additional water (e.g., ambient humidity in the air) can cross over from the cathode manifold 116 to the anode manifold 112. However, this humidity needs to be controlled to promote efficient and long-term operation of the fuel cell 110. In some embodiments, the humidity controller can be controlled by the controller 174. In some embodiments, the humidity controller 180 can operate independently (e.g., based on predetermined humidity threshold levels).

Excessive humidity can block pores in the membranes 113, 117, reducing the efficiency of the fuel cell 110. The humidity controller 180 is configured to controllably reduce humidity in the hydrogen flow to a predetermined humidity level and purge extracted water though the purge valve 182. However, since water takes up volume in the hydrogen flow to the anode manifold, removal of humidity can cause a drop in pressure. As will be described in more detail below, the controller 174 is configured to control pressure within the anode manifold 112.

Insufficient humidity can also have negative effects on the fuel cell. For example, membranes 113, 117 generally do not work well when dry, and may eventually crack or fail, leading to reduced fuel cell efficiency and or system failure. The humidity controller 180 is configured to receive an inflow of water 184 and controllably humidify the hydrogen flow to a predetermined humidity level. However, water occupies space within the hydrogen flow, so the addition of humidity can alter the pressure at the anode manifold 112. As will be described in more detail below, the controller 174 is configured to control pressure within the anode manifold 112.

The controller 174 is configured to receive a temperature signal and a pressure signal representative a temperature and a pressure within the anode manifold 112 from an anode sensor 138 configured as a pressure sensor and as a temperature sensor. In some embodiments, the temperature sensor and the pressure sensor functions may be provided by separate sensors. The controller 174 is also configured to receive a pressure signal representative a pressure within the cathode manifold 116 from a cathode sensor 139 configured as a pressure sensor. The controller 174 is configured to determine a differential pressure 136 by comparing the difference between the signals provided by the pressure sensors 138 and 139. In some implementations, the pressure and temperature signals can be used by the controller 174 to perform model-based feedback control of pressure at the anode manifold 112. In some embodiments, a true "delta pressure sensor" can be used in place of two independent pressure sensors due to control accuracy requirements (+/− 1%) and that in some implementations the differential pressure target can be on the order of 100-200 mbar, while the supply pressures can be on the order of 1 to 4 bar absolute pressure.

A fuel measurement valve 161 is configured to control an exit flow area of the anode manifold 112. By controlling the valve 161, the controller 174 can control the backpressure in the anode manifold 112. Additionally, the jet pump 172 may employ recirculation flow measurements.

The controller 174 is configured to control pressure at the anode manifold 112 based on the differential pressure 136 and the sensed temperature. For example, the differential pressure 136 can describe the amount of pressure change that is needed. If additional pressure is needed, the controller 174 can control the EPRS 170 to admit more fresh hydrogen into the hydrogen flow, the controller 174 can control the jet pump 172 to reduce the amount of recirculated hydrogen that is allowed to re-enter the hydrogen flow (e.g., creating back pressure by actuating one or more valves and/or variable area nozzles configured to control fresh and/or recirculated flow through the jet pump 172), and/or the controller 174 can control the valve 161 or valve 119 to increase back pressure in the anode manifold 112. If the pressure is too high, the controller 174 can control the EPRS 170 to reduce the flow of fresh hydrogen into the hydrogen flow, control the jet pump 172 (e.g., actuate one or more valves within the jet pump 172 that control recirculated flow and/or fresh flow) to increase the amount of recirculated hydrogen that is allowed to re-enter the hydrogen flow, and/or control the valve 161 to reduce back pressure in the anode manifold 112, and even open the nitrogen purge valve if quick pressure reduction is required. As hydrogen is consumed by the fuel cell, the pressure in the anode manifold 112 will drop. In some implementations, the humidity of the hydrogen flow can be measures and used by the controller 174 to perform model-based feedback control of pressure at the anode manifold 112.

The controller 174 can also control pressure by controlling the humidity controller 108 to add or remove volume-occupying water from the hydrogen flow. The controller 174 can also control the nitrogen separator 176 to control pressure, by selectively purging or retaining nitrogen in the hydrogen flow. In some implementations, the nitrogen concentration in the hydrogen flow can be measured and used by the controller 174 to perform model-based feedback control of pressure at the anode manifold 112.

The controller 174 is also configured to control pressure based on the amount of hydrogen being consumed by the fuel cell 110. A current sensor 190 is configured to sense an amount of current in the power output 130 of the fuel cell 110 and provide a current measurement signal to the controller 174. Since the amount of hydrogen being consumed by the fuel cell 110 is proportional to the amount of output power 130 being produced, the controller 174 can model and estimate and/or anticipate the amount of additional hydrogen needed from the pressurized hydrogen 154 to make up for the consumption.

The controller 174 is also configured to perform feed-forward (e.g., model-based) control of pressure at the anode manifold 112. A current sensor 191 is configured to sense an amount of current in a power input 192 to the compressor 124 and provide a current measurement signal to the controller 174. Since the amount of pressure being provided to the cathode manifold 116 is proportional to and/or is predictive of a pressure that will exist at the cathode manifold 116, the current signal from the current sensor 191 can be used by the controller 174 to model and estimate the current pressure of the cathode manifold 116 and/or anticipate the future pressure of the cathode manifold 116.

In some embodiments, performance can be improved with a "heads-up" power demand from an external fuel cell system controller. In some implementations, a power setpoint can be determined, and then the external fuel cell system controller can ramp the compressor power to transition to the new setpoint over a finite, predetermined period of time. In some examples, knowing this in advance can enable the controller 174 to anticipate the make up hydrogen requirements, and through the feed-forward model precisely match the hydrogen consumption rate, while managing the recirculation and other flows to also maintain the anode manifold pressure to maintain the differential pressure across the membrane. The controller 174 can monitor the cathode manifold pressure, but the external fuel cell system controller can determine the rate of change and/or target pressure values for the cathode manifold 116. For example, the controller 174 can bridge the knowledge un-certainly with knowledge of the fuel cell output current, the current to the compressor, and known mathematical-physics relationships (e.g., models) to determine current and/or future hydrogen needs, which are inputs to the physical model, such that the output can be actuator settings configured to meet the consumption demand changes while maintaining a very small deviation in the differential pressure across the membrane.

Figure 2:
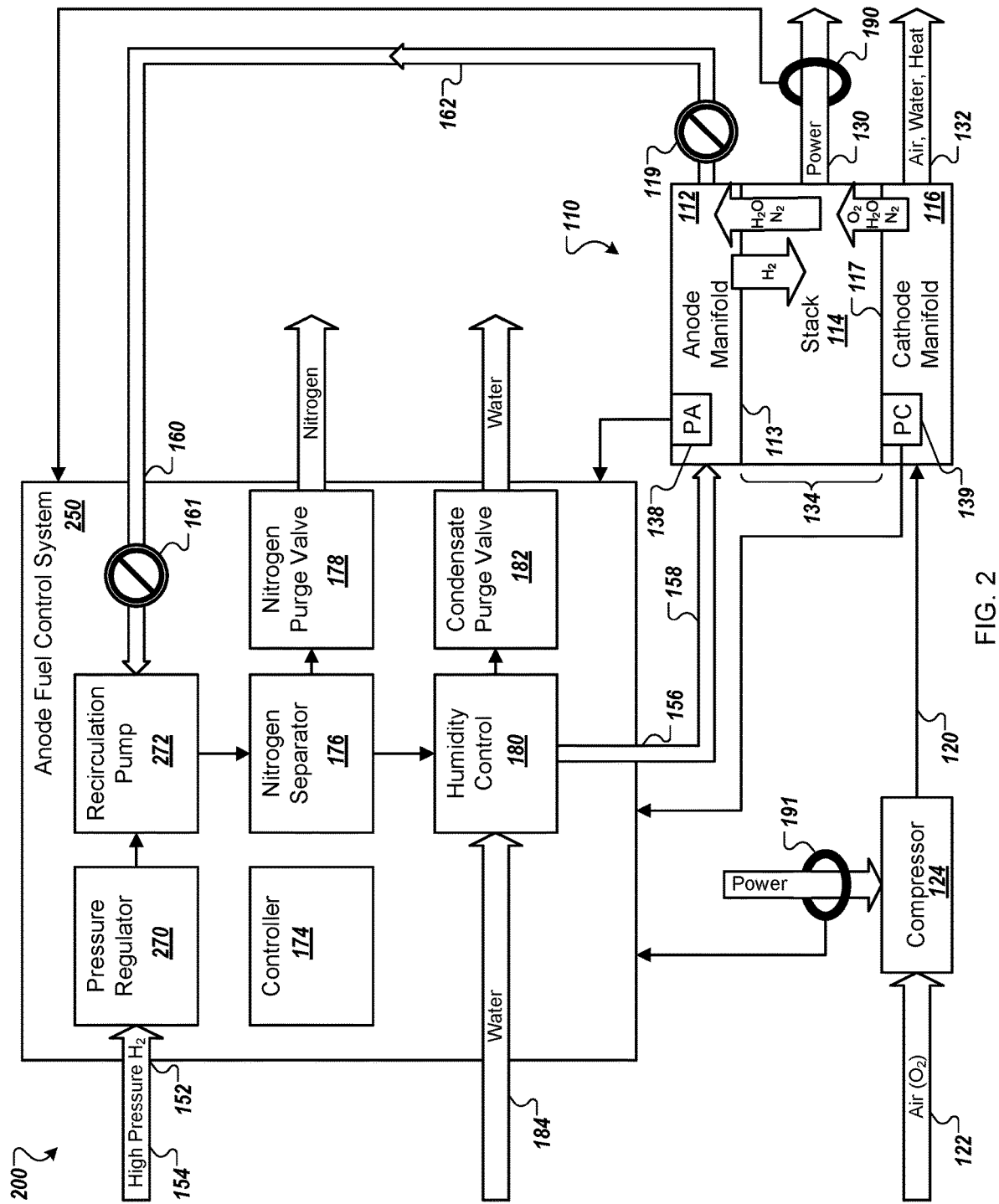
FIG. 2 is a schematic diagram that shows another example hydrogen fuel cell system.

FIG. 2 is a schematic diagram that shows another example hydrogen fuel cell system 200. In general, the system 200 is substantially similar to the example system 100 of FIG. 1, with a hydrogen fuel cell anode control system 250, in which the EPRS 170 is replaced by a pressure regulator 270, and the EGR system 172 is replaced by a recirculation pump 272.

In some embodiments, the pressure regulator 270 can be a fixed pressure regulator, configured to regulate pressure of the pressurized hydrogen 154 to a predetermined fixed pressure. In some embodiments, the pressure regulator 270 can be a manually-adjustable pressure regulator that can be set at a predetermined pressure. In some embodiments, the pressure regulator 270 can be a controllable pressure regulator. For example, the pressure regulator 270 can be controlled by the controller 174 to a controlled pressure that is predetermined by the controller 174.

The recirculation pump 272 is an anode recirculation blower that is configured to recirculate hydrogen that has not been consumed (due to an operating surplus) from the stack 113 and return it back to the hydrogen flow. Operation of the recirculation pump 272 is controlled by the controller 174.

Figure 3:
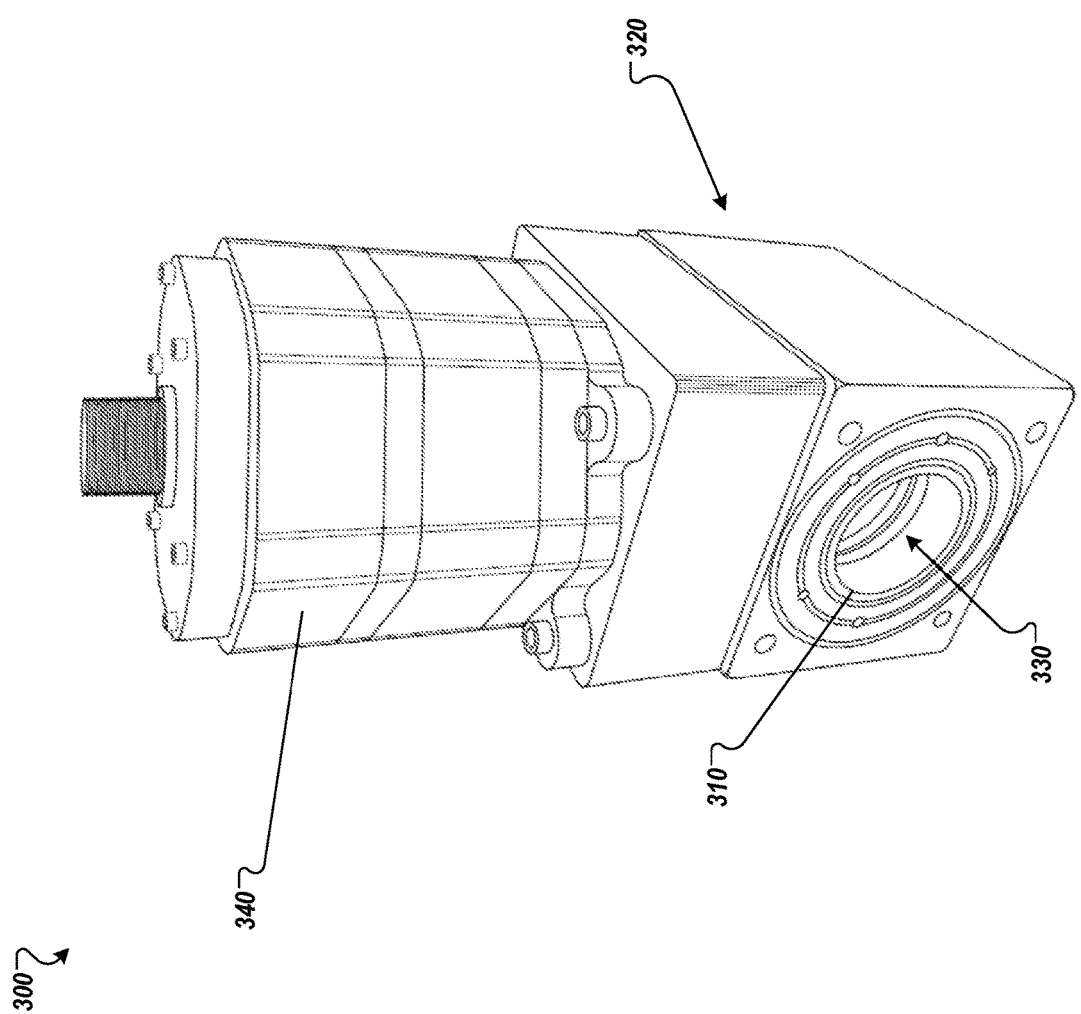
FIG. 3 shows a perspective view of an example electronic pressure regulator system.

FIG. 3 shows a perspective view of an example electronic pressure regulator system (EPRS) 300. In some embodiments, the EPRS 300 can be the example EPRS 170 of FIG. 1.

The EPRS 300 includes an inlet 310, and outlet 320, and a valve 330 that is configured to selectively permit, restrict, and/or block flow from the inlet 310 to the outlet 320. The valve 330 is actuated by an actuator 340 that is configured to be controlled by an external controller (e.g., the controller 174 of FIG. 1). The EPRS 300 uses a ported ball valve tor high precision and large turn-down, and is actuated by a rotary valve with sufficient torque capability to move the valve precisely. In some embodiments, the EPRS 300 can also implement model-based mathematics that can enable it to measure the hydrogen primary flow.

Figure 4:
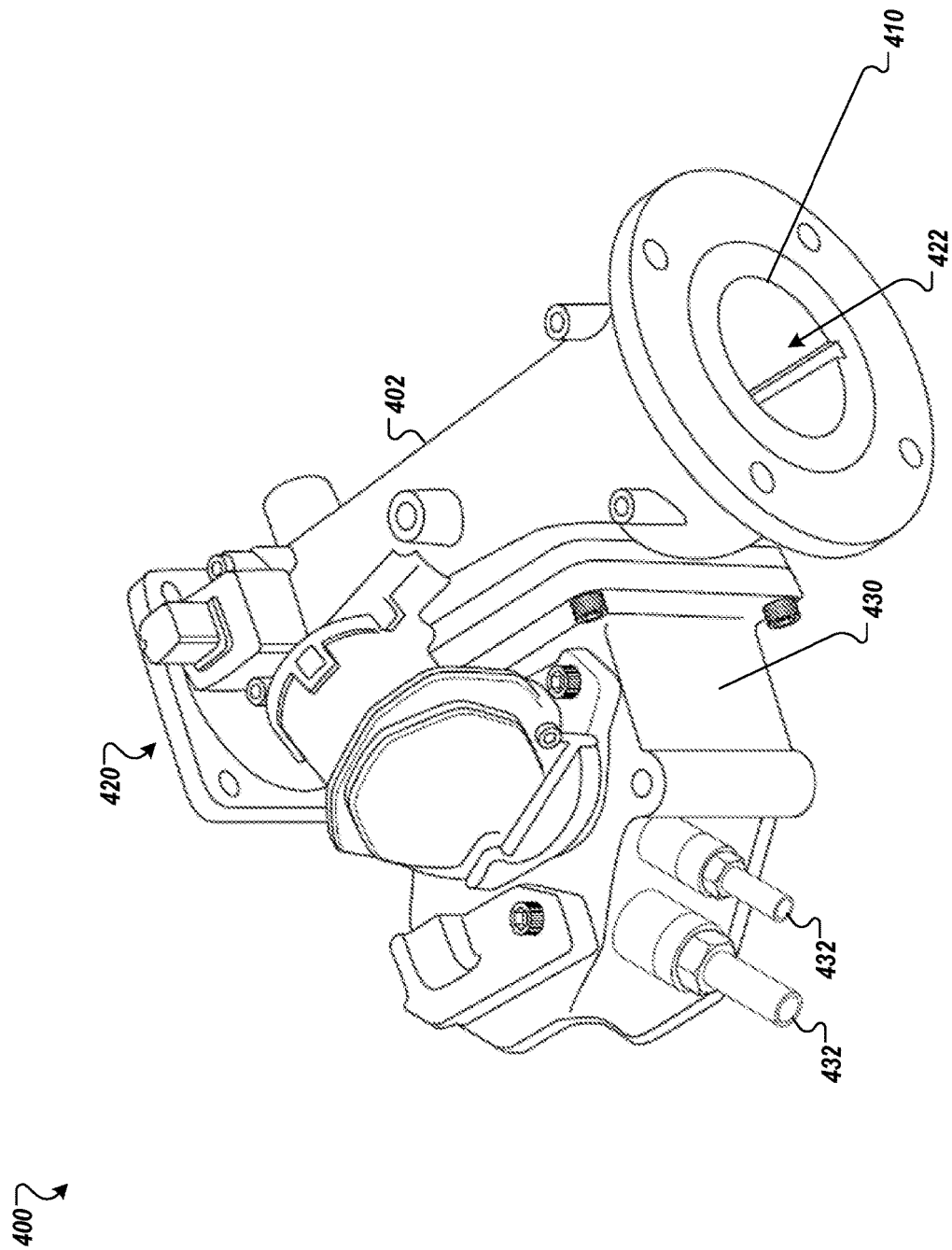
FIG. 4 shows a perspective view of an example jet pump.

FIG. 4 shows a perspective view of an example jet pump 400. In some embodiments, the jet pump 400 can be the example jet pump 172 of FIG. 1.

The jet pump 400 is made up of one or more housings or casings 402. Openings in the end walls of the casings define a hydrogen inlet 410 and an outlet 420 of an interior flow passage 422 defined by casing(s) 402. The interior flow passage 422 directs flow from the hydrogen inlet 410 to the outlet 420 to allow flow through the jet pump 400. Within the casing(s) 402, the jet pump 400 includes a convergent nozzle in a flow path from the hydrogen inlet 410 to the outlet 420. The convergent nozzle includes a convergent portion that converges in the direction of flow toward a convergent end. That is, the downstream end (outlet) of the convergent nozzle has a smaller cross-sectional area, e.g., a smaller flow area, than the upstream end (inlet) of the convergent nozzle. The convergent nozzle can include portions that do not converge, but remain relatively straight without changing a cross-sectional flow area. Such sections can be used to retain the convergent nozzle within the jet pump 400. The jet pump 400 includes a gas receiver housing 430 and the housing 430 includes one or more gas inlets 432 fed from and fluidically connected to recirculation flow (e.g., e.g., connected to the example recirculation inlet port 160 to receive the recirculation gasses 162) and into an interior receiver cavity of the gas housing 430. In the illustrated implementation, the housing 430 surrounds the convergent nozzle, such that a portion of the convergent nozzle is within the interior receiver cavity 422. The convergent nozzle is positioned to form a free jet of gas out of the convergent end of the convergent nozzle. Also, the gas inlets 432 are upstream of the convergent end of the convergent nozzle. While the illustrated implementation shows the convergent nozzle to be at least partially within the gas receiver housing 430, other designs can be utilized.

A convergent-divergent nozzle is downstream of the convergent portion of the convergent nozzle and is fluidically coupled to receive fluid flow from the convergent end, the gas inlet 432. To help facilitate mixing, an inlet of the convergent-divergent nozzle has a greater area than an exit of the convergent nozzle. The convergent-divergent nozzle includes three parts: the hydrogen inlet 410, a throat, and the outlet 420. The throat is the narrowest point of the convergent-divergent nozzle and is located and fluidically connected downstream of the hydrogen inlet 410 of the convergent-divergent nozzle. The narrowing of the convergent-divergent nozzle at the throat increases a flow velocity of a fluid flow as it passes through the convergent-divergent nozzle. The outlet 420 of the convergent-divergent nozzle is fluidically connected to and upstream of the anode manifold 112. Between the throat and the outlet 420, the cross-section of the flow passage through the convergent-divergent nozzle increases. The increase in cross-sectional area slows the flow velocity and raises the pressure of the fluid flow. In certain instances, the increase in cross-sectional area can be sized to increase a pressure within the jet pump 400 so that the pressure drop across the jet pump 400 is zero, nominal, or otherwise small.

Figure 5:
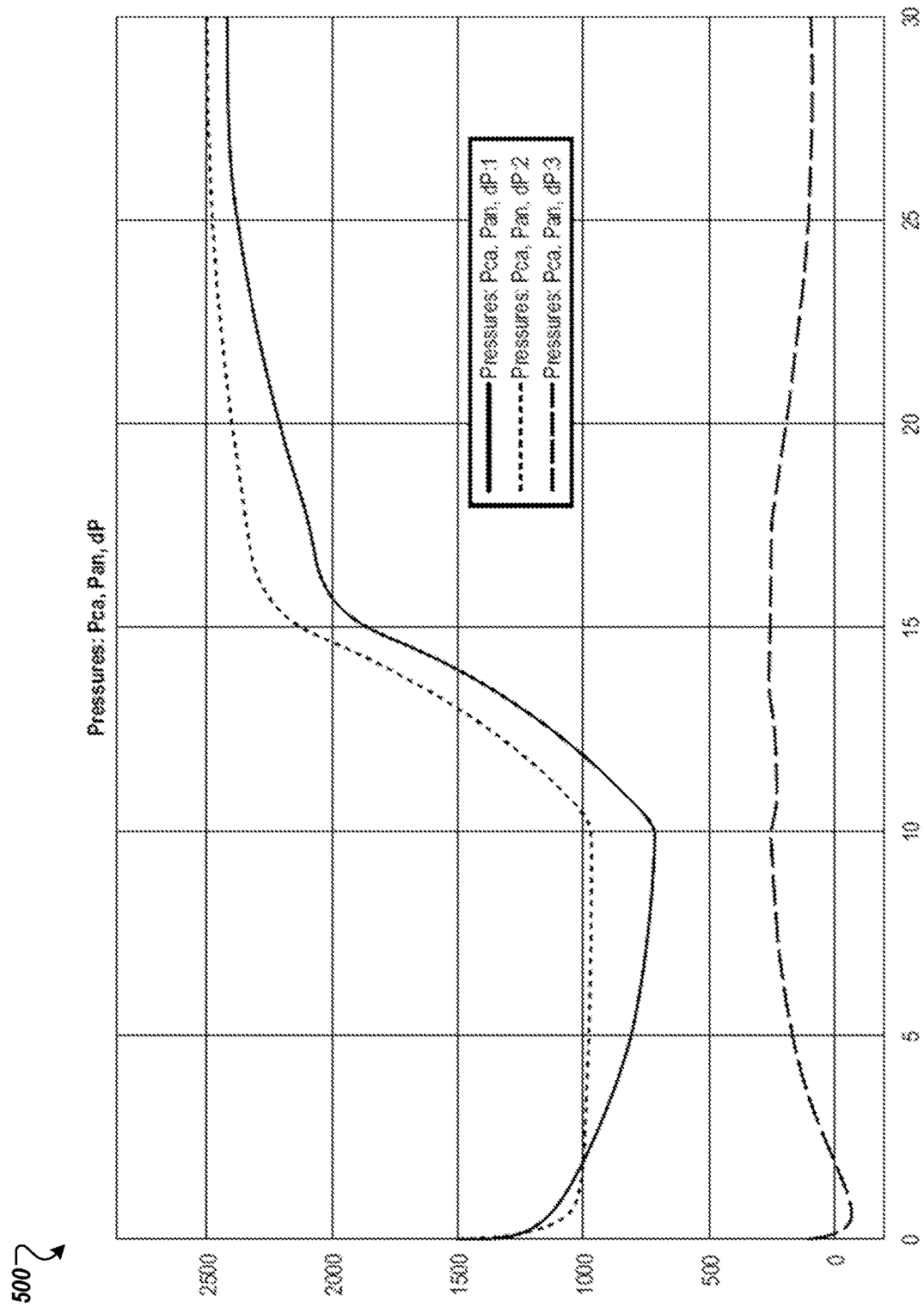
FIG. 5 is a chart of example differential pressures.

FIG. 5 is a chart 500 of differential pressures. The chart 500 shows the pressure in an example anode manifold (P1), an example cathode manifold (P2), and a differential pressure, P3=P2−P1. In some existing fuel cells, the fuel cells are designed for the cathode pressure to be the higher of the two pressures. The chart 500 shows that during power up transient, there is a loss of pressure on P1 and P2 due to increased stack hydrogen and air consumption. The chart 500 shows an example of how model-based controls can be used to manage the hydrogen flow to manage the anode pressure within a predetermined, acceptable range of differential pressure of the independently controlled cathode manifold pressure.

Figure 6:
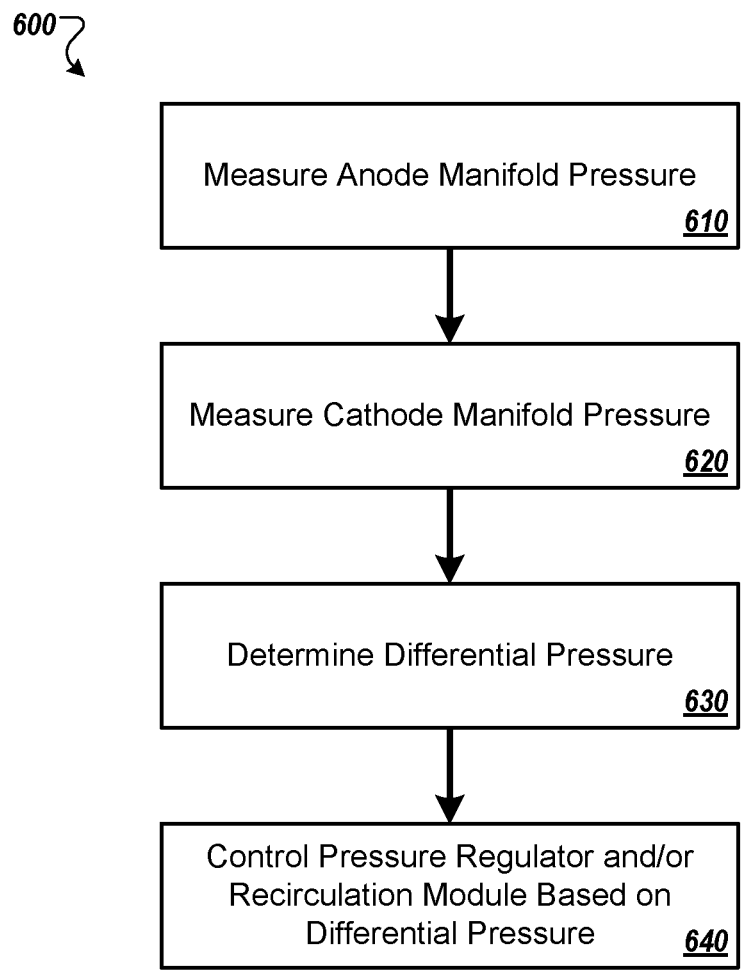
FIG. 6 is flow chart that shows an example of a process for controlling hydrogen delivery in hydrogen fuel cells.

FIG. 6 is flow chart that shows an example of a process 600 for controlling hydrogen delivery in hydrogen fuel cells. In some implementations, the process 600 can be performed by the example controller 174 of FIGS. 1 and 2.

At 610, an anode manifold pressure is measured. For example, the controller 174 can read a pressure signal from the sensor 138 to measure a pressure within the anode manifold 112.

At 620, a cathode manifold pressure is measured. For example, the controller 174 can read a pressure signal from the sensor 139 to measure a pressure within the cathode manifold 116.

At 630, a differential pressure value is determined based on the measured anode manifold pressure and the measured cathode manifold pressure. For example, the controller 174 can compare (e.g., subtract) the pressure value determined from the sensor 138 and the pressure value determined from the sensor 139 to determine the differential pressure 134.

At 640, at least one of a hydrogen pressure regulator or a hydrogen recirculation module is controlled based on the determined differential pressure. For example, the controller 174 can control the operation of one or both of the EPRS module 170 or the jet pump 172 to raise or lower the pressure at the anode manifold 112 to drive the differential pressure 134 toward zero or another appropriate predetermined value.

Figure 7:
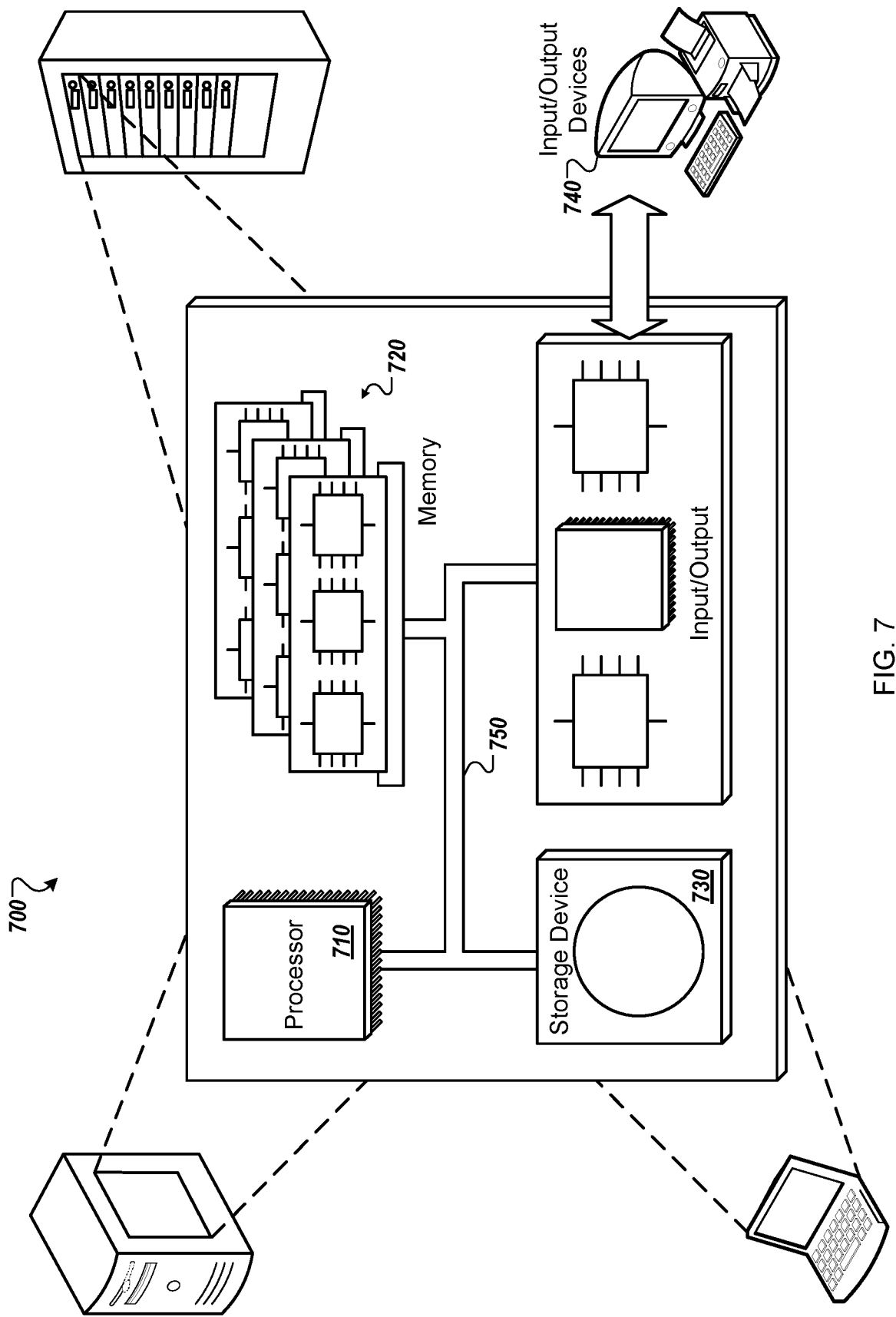
FIG. 7 is a schematic diagram of an example of a generic computer system.

FIG. 7 is a schematic diagram of an example of a generic computer system 700. The system 700 can be used for the operations described in association with the method 300 according to one implementation. For example, the system 700 may be included in the example controller 174 of FIGS. 1 and 2.

The system 700 includes a processor 710, a memory 720, a storage device 730, and an input/output device 740. Each of the components 710, 720, 730, and 740 are interconnected using a system bus 750. The processor 710 is capable of processing instructions for execution within the system 700. In one implementation, the processor 710 is a single-threaded processor. In another implementation, the processor 710 is a multi-threaded processor. The processor 710 is capable of processing instructions stored in the memory 720 or on the storage device 730 to display graphical information for a user interface on the input/output device 740.

The memory 720 stores information within the system 700. In one implementation, the memory 720 is a computer-readable medium. In one implementation, the memory 720 is a volatile memory unit. In another implementation, the memory 720 is a non-volatile memory unit.

The storage device 730 is capable of providing mass storage for the system 700. In one implementation, the storage device 730 is a computer-readable medium. In various different implementations, the storage device 730 may be a floppy disk device, a hard disk device, an optical disk device, or a tape device.

The input/output device 740 provides input/output operations for the system 700. In one implementation, the input/output device 740 includes a keyboard and/or pointing device. In another implementation, the input/output device 740 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

Although a few implementations have been described in detail above, other modifications are possible. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A hydrogen fuel cell anode control system, comprising:
   a hydrogen inlet configured to receive pressurized hydrogen;
   a hydrogen outlet configured to be fluidically coupled to an anode manifold of a hydrogen fuel cell;
   a recirculation inlet configured to receive overflow hydrogen from the anode manifold;
   a hydrogen pressure regulator configured to receive pressurized hydrogen from the hydrogen inlet;
   a hydrogen recirculation module configured to mix hydrogen received from the hydrogen pressure regulator and the recirculation inlet, and provide a hydrogen mixture to the hydrogen outlet;
   a current sensor configured to provide a first electrical current measurement based on a power input of a compressor configured to provide oxygen to a cathode manifold of the hydrogen fuel cell;
   a controller configured to:
     measure a differential pressure between the anode manifold and the cathode manifold of the hydrogen fuel cell;
     receive, at a current feedback input port, a second electrical current measurement based on a power output of the hydrogen fuel cell; and
     control at least one of the hydrogen pressure regulator or the hydrogen recirculation module based on the measured differential pressure and the second electrical current measurement
     receive, at a second current feedback input port, the first electrical current measurement; and
     receive the first electrical current measurement and control at least one of the hydrogen pressure regulator or the hydrogen recirculation module based on the first electrical current measurement.

2. The system of claim 1, wherein the controller is configured to control hydrogen pressure such that the differential pressure is about zero.

3. The system of claim 1, wherein the hydrogen pressure regulator is a controllable gas pressure regulator system.

4. The system of claim 1, wherein the hydrogen recirculation module comprises a gas recirculation pump.

5. The system of claim 1, wherein the hydrogen recirculation module comprises a jet pump.

6. The system of claim 1, wherein the controller is configured to control hydrogen pressure based on a predetermined control model.

7. The system of claim 1, further comprising a humidity controller configured to control a humidity level of the hydrogen mixture.

8. The system of claim 1, further comprising a nitrogen separator configured to reduce a nitrogen level in at least one of the overflow hydrogen or the hydrogen mixture.

9. The system of claim 1, wherein the controller is further configured to control a variable pressure control valve configured to control a pressure of the overflow hydrogen.

10. The system of claim 1, further comprising:
a hydrogen fuel cell comprising the anode manifold, a stack, and the cathode manifold.

* * * * *